(12) United States Patent
Vallo

(10) Patent No.: US 11,369,197 B2
(45) Date of Patent: Jun. 28, 2022

(54) CANTILEVERED AND EXTENDABLE SUPPORT SYSTEMS FOR SUPPORTING STORAGE COMPARTMENTS

(71) Applicant: Matthew John Vallo, Dayton, OH (US)

(72) Inventor: Matthew John Vallo, Dayton, OH (US)

( * ) Notice: Subject to any disclaimer, the term of this patent is extended or adjusted under 35 U.S.C. 154(b) by 132 days.

(21) Appl. No.: 16/523,959

(22) Filed: Jul. 26, 2019

(65) Prior Publication Data
US 2020/0187647 A1    Jun. 18, 2020

Related U.S. Application Data

(60) Provisional application No. 62/703,591, filed on Jul. 26, 2018.

(51) Int. Cl.
| | |
|---|---|
| *A47B 88/407* | (2017.01) |
| *A47B 88/43* | (2017.01) |
| *F16M 13/02* | (2006.01) |
| *A47B 88/00* | (2017.01) |
| *A47B 95/02* | (2006.01) |
| *A47F 5/08* | (2006.01) |

(52) U.S. Cl.
CPC ............ *A47B 88/407* (2017.01); *A47B 88/00* (2013.01); *A47B 88/43* (2017.01); *F16M 13/022* (2013.01); *A47B 2095/024* (2013.01); *A47B 2210/0005* (2013.01); *A47F 5/08* (2013.01)

(58) Field of Classification Search
CPC ....... A47B 88/407; A47B 88/00; A47B 88/43; A47B 2095/024; A47B 2210/0005; A47B 88/50; A47B 2088/4276; A47B 2088/4278; A47B 96/025; A47B 96/027; A47B 96/061; A47B 96/067; A47B 96/07; F16M 13/022; A47F 5/08; F16B 5/008; F16B 7/14
See application file for complete search history.

(56) References Cited

U.S. PATENT DOCUMENTS

| | | | | |
|---|---|---|---|---|
| 3,221,677 A | * | 12/1965 | Kerr .................... | A47B 45/00 108/102 |
| 4,244,546 A | * | 1/1981 | Mertes ................ | A47B 88/407 248/258 |
| 4,731,960 A | * | 3/1988 | Sease .................... | B44C 7/022 160/392 |
| 5,673,801 A | * | 10/1997 | Markson ................ | A47F 1/126 211/184 |
| 6,364,136 B1 | * | 4/2002 | Weshler ............... | A47B 96/025 108/102 |
| 6,497,185 B1 | * | 12/2002 | Barrett ................ | A47B 96/025 108/108 |
| 7,625,051 B1 | * | 12/2009 | Kim ...................... | A47B 88/43 312/334.27 |

(Continued)

*Primary Examiner* — Hanh V Tran
(74) *Attorney, Agent, or Firm* — Porter, Wright, Morris & Arthur, LLP

(57) ABSTRACT

A support system for a storage container includes an extendable slide assembly having a first end and a second end, and a support bracket removably receiving the first end of the extendable slide assembly to support the extendable slide assembly in a cantilevered manner. The second end of the extendable slide assembly is configured to support the storage container.

23 Claims, 19 Drawing Sheets

(56) References Cited

U.S. PATENT DOCUMENTS

| | | | | |
|---|---|---|---|---|
| 8,944,621 B2* | 2/2015 | Driver | A47B 96/028 | |
| | | | 362/92 | |
| 9,038,833 B2* | 5/2015 | Ciesick | A47F 1/126 | |
| | | | 211/59.3 | |
| 10,334,967 B2* | 7/2019 | Mercier | A47F 5/0087 | |
| 11,064,817 B2* | 7/2021 | Turner | A47F 5/0093 | |
| 2005/0225219 A1* | 10/2005 | Chen | A47B 88/43 | |
| | | | 312/334.5 | |
| 2005/0263465 A1* | 12/2005 | Chung | A47F 5/0093 | |
| | | | 211/90.02 | |
| 2009/0032482 A1* | 2/2009 | Battaglia | A47F 5/0823 | |
| | | | 211/59.1 | |
| 2009/0134290 A1* | 5/2009 | Begic | F16M 13/02 | |
| | | | 248/222.13 | |
| 2012/0061534 A1* | 3/2012 | Rehage | A47B 88/43 | |
| | | | 248/214 | |
| 2012/0145845 A1* | 6/2012 | Hightower | A47B 88/423 | |
| | | | 248/201 | |
| 2012/0145856 A1* | 6/2012 | Reidt | A47B 88/43 | |
| | | | 248/226.11 | |
| 2012/0305718 A1* | 12/2012 | Park | F24C 15/16 | |
| | | | 248/201 | |
| 2013/0193095 A1* | 8/2013 | Nagel | A47F 1/04 | |
| | | | 211/59.3 | |
| 2014/0034590 A1* | 2/2014 | Szpak | A47F 1/04 | |
| | | | 211/59.2 | |
| 2014/0190917 A1* | 7/2014 | Szpak | A47F 1/12 | |
| | | | 211/134 | |
| 2014/0346129 A1* | 11/2014 | Hall | A47J 47/16 | |
| | | | 211/162 | |
| 2015/0022071 A1* | 1/2015 | Chen | A47F 3/063 | |
| | | | 312/334.8 | |
| 2015/0230628 A1* | 8/2015 | Juric | A47F 1/12 | |
| | | | 211/59.2 | |
| 2015/0296982 A1* | 10/2015 | Chen | A47B 88/43 | |
| | | | 312/334.8 | |
| 2016/0206092 A1* | 7/2016 | Hernandez Zaragoza | | |
| | | | A47B 88/402 | |
| 2016/0325693 A1* | 11/2016 | Kim | F16M 11/041 | |
| 2017/0079425 A1* | 3/2017 | Mansley | A47B 67/04 | |
| 2017/0172300 A1* | 6/2017 | Bowman | A47B 88/487 | |
| 2017/0202369 A1* | 7/2017 | Mercier | G01B 21/16 | |
| 2018/0014638 A1* | 1/2018 | Hanley | A47B 46/005 | |
| 2018/0020848 A1* | 1/2018 | Mercier | A47F 5/005 | |
| | | | 108/61 | |
| 2018/0035825 A1* | 2/2018 | Pollpeter | A47F 7/0014 | |
| 2018/0128538 A1* | 5/2018 | Jang | A47B 96/025 | |
| 2019/0174919 A1* | 6/2019 | Greenwood | A47B 88/407 | |
| 2020/0015601 A1* | 1/2020 | Padvoiskis | A47F 1/12 | |

* cited by examiner

CANTILEVERED AND EXTENDABLE SUPPORT SYSTEMS FOR SUPPORTING STORAGE COMPARTMENTS

CROSS-REFERENCE TO RELATED APPLICATIONS

This application claims the priority benefit of U.S. Provisional Patent Application No. 62/703,591 filed on Jul. 26, 2018, the disclosure of which is expressly incorporated herein in its entirety by reference.

STATEMENT REGARDING FEDERALLY SPONSORED RESEARCH

Not Applicable

PARTIES TO A JOINT RESEARCH AGREEMENT

Not Applicable

REFERENCE TO APPENDIX

Not Applicable

FIELD OF THE INVENTION

The field of the present invention generally relates to storage containers and, more particularly, to systems and methods for supporting storage containers.

BACKGROUND OF THE INVENTION

Many types of storage containers or compartments are used to store and/or transport a wide variety of goods. Such storage containers or compartments include, but are not limited to, bags, baskets, bins, boxes, buckets, cabinets, caddies, canisters, cans, chests, coolers, crates, cubes, drawers, luggage, suitcases, trunks, totes, tubs, and the like. Storage containers typically hold the goods in a satisfactory manner. However, the storage containers must typically be placed on the floor, furniture, shelves, and/or the like. This can occupy large amounts of space and can even result in the storage containers being stacked on top of one another and/or in front of one another. This stacking of storage containers can severely reduce access to the contents of the storage containers. It can also be difficult to access contents when the storage containers are placed on shelves or furniture because the storage containers can be at inconvenient heights and/or can be difficult to move.

One such situation is traveling individuals using luggage for transporting their personal belongings. Upon arrival at a destination, clothing and/or other personal items stored in the luggage must be removed from the luggage and placed in drawers of furniture such as a dresser or the like. This transfer can require considerable effort, particularly when situation where the stay is as short as a single night. Alternatively, the clothing and/or personal items can remain stored in the luggage with the luggage placed on top of furniture or on the top of a luggage stand. However, such an approach occupies the furniture top or floor space so that it cannot be used in other ways. Additionally, there often is not enough furniture or luggage stands to accommodate all of the luggage.

Accordingly, there is a need for improved systems and methods for supporting storage containers and compartments.

SUMMARY OF THE INVENTION

Disclosed are systems and methods for supporting storage containers that overcome at least one of the disadvantages of the prior art described above. Disclosed is a support system for a storage container including, in combination, an extendable slide assembly having a first end and a second end, and a support bracket removably receiving the first end of the extendable slide assembly to support the extendable slide assembly in a cantilevered manner. The second end of the extendable slide assembly is configured to support the storage container.

Also disclosed is a support bracket for supporting an extendable slide assembly in a cantilevered manner from a support. The extendable slide assembly has a first end for removable attachment to the support bracket and a second end for supporting a storage compartment. The support bracket includes, in combination, a mounting portion configured to be secured to the support, and an attachment portion supported by the mounting portion and configured to removably receive the first end of the extendable slide assembly. The attachment portion includes at least one downward facing abutment configured to limit upward movement of the first end of the extendable slide assembly, at least one upward facing abutment configured to limit downward movement of the first end of the extendable slide assembly, a rearward facing abutment configured to limit forward movement of the first end of the extendable slide assembly.

Also disclosed is an extendable slide assembly including, in combination, at least one pair of telescoping extendable members extending between a first end and a second end, a release actuator at second end which when activated, enables the extendable slide assembly to be extended and retracted, and a handle latch at the second end that releasably locks the extendable slide assembly against extending when the extendable slide assembly is fully retracted and the release actuator is actuated.

From the foregoing disclosure and the following more detailed description of various preferred embodiments it will be apparent to those skilled in the art that the present invention provides a significant advance in the technology and art of storage container support systems and methods. Particularly significant in this regard is the potential the invention affords for storage container support systems and methods that that enable persons to removably support storage containers in a cantilevered and/or extendable manner with minimal effort and inconvenience. Additional features and advantages of various preferred embodiments will be better understood in view of the detailed description provided below.

BRIEF DESCRIPTION OF THE DRAWINGS

These and further features of the present invention will be apparent with reference to the following description and drawing, wherein.

Figure 1:
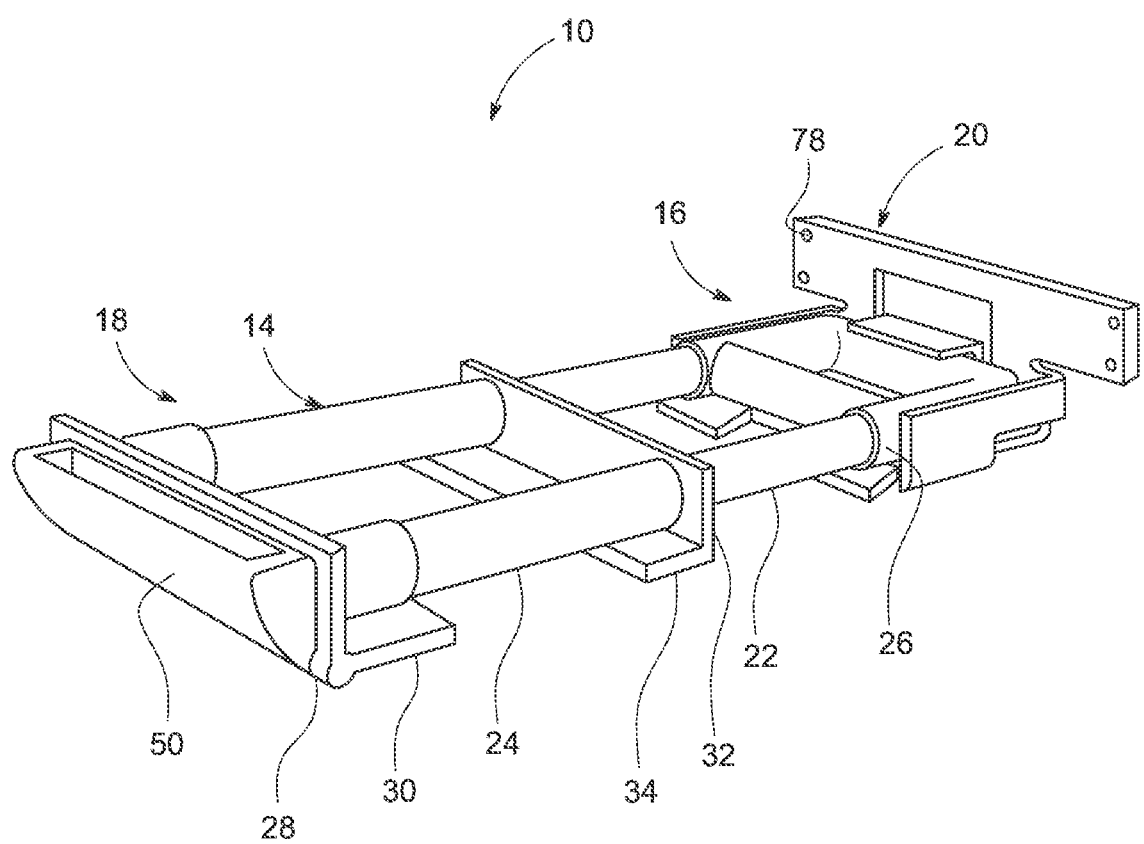
FIG. 1 is a perspective view of a support system for a storage container according to a first embodiment of the present invention, wherein an extendable slide assembly is in an extended position and removably secured to a support bracket in a cantilevered manner.

It should be understood that the appended drawings are not necessarily to scale, presenting a somewhat simplified representation of various preferred features illustrative of the basic principles of the invention. The specific design features of the support systems as disclosed herein, including, for example, specific dimensions and shapes of the various components will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the storage compartment support systems illustrated in the drawings. In general, up or upward refers to an upward direction generally within the plane of the paper in FIG. 1 and down or downward refers to a downward direction generally within the plane of the paper in FIG. 1. Also in general, forward or front refers to a direction extending to the left generally within the plane of the paper in FIG. 1 and back or rear refers to a direction extending to the right generally within the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the support systems and methods for storage containers disclosed herein. The following detailed discussion of various alternative and preferred embodiments will illustrate the general principles of the invention. Other embodiments suitable for other applications will be apparent to those skilled in the art given the benefit of this disclosure.

Figure 2:
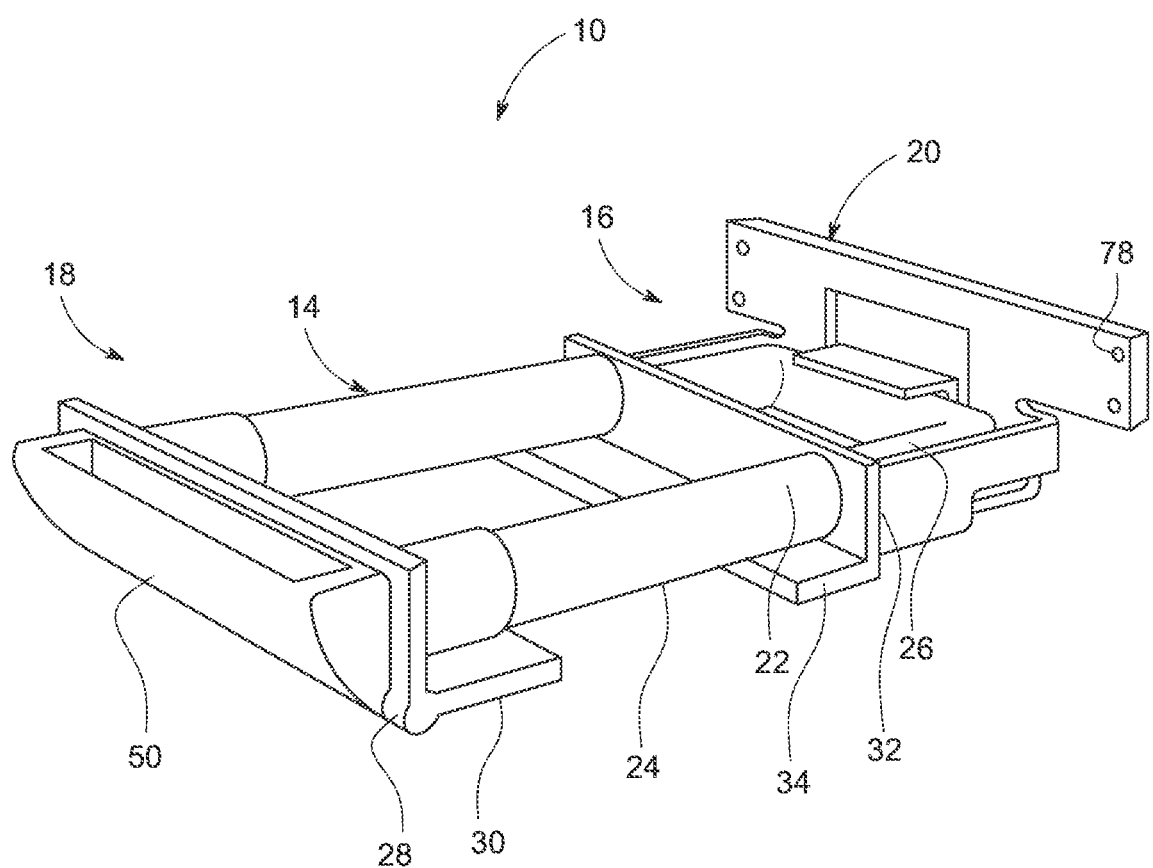
FIG. 2 is a perspective view of the support system of FIG. 1, wherein the extendable slide assembly is in retracted position.
Figure 3:
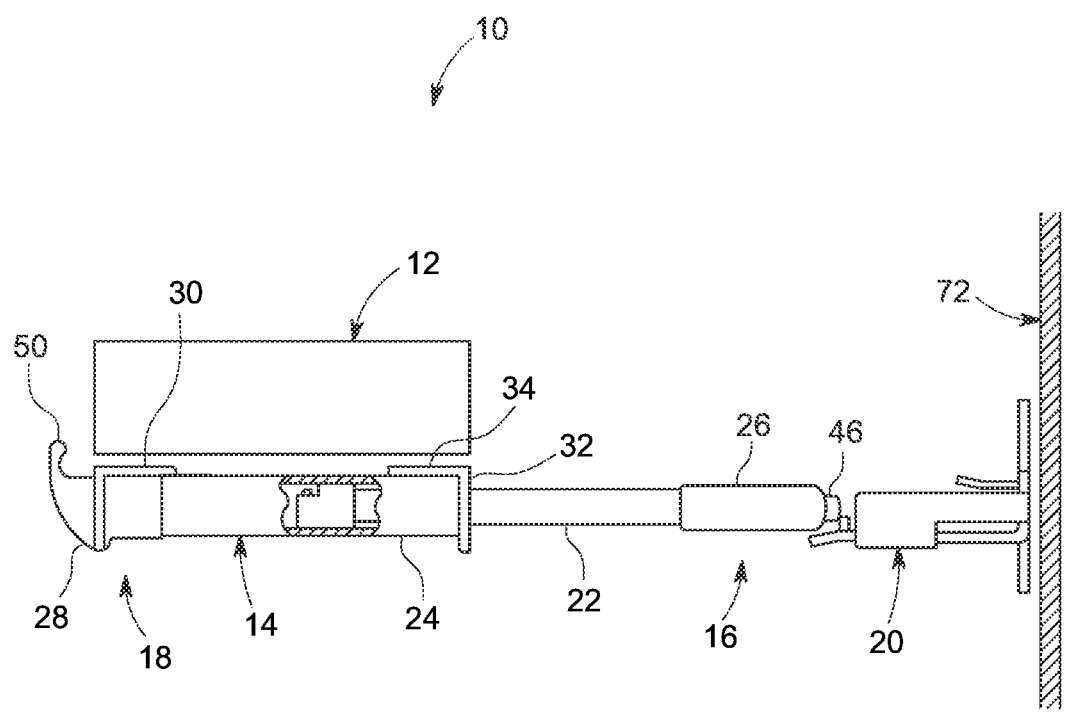
FIG. 3 is an exploded side elevational view of a variation of the support system of FIG. 1, wherein flanges for engaging the storage container face in an opposite direction.

FIGS. 1 to 3 illustrate a support system 10 for a storage container 12 according to the present invention. The illustrated support system 10 includes an extendable slide assembly 14 having a first end 16 and a second end 18, and a support bracket 20 removably receiving the extendable slide assembly 14 to support the extendable slide assembly 14 in a cantilevered manner. The first end 16 of the illustrated extendable slide assembly 14 is removably received by the support bracket 20 and the second end 18 of the illustrated extendable slide assembly 14 is configured to support the storage container 12.

Figure 4:
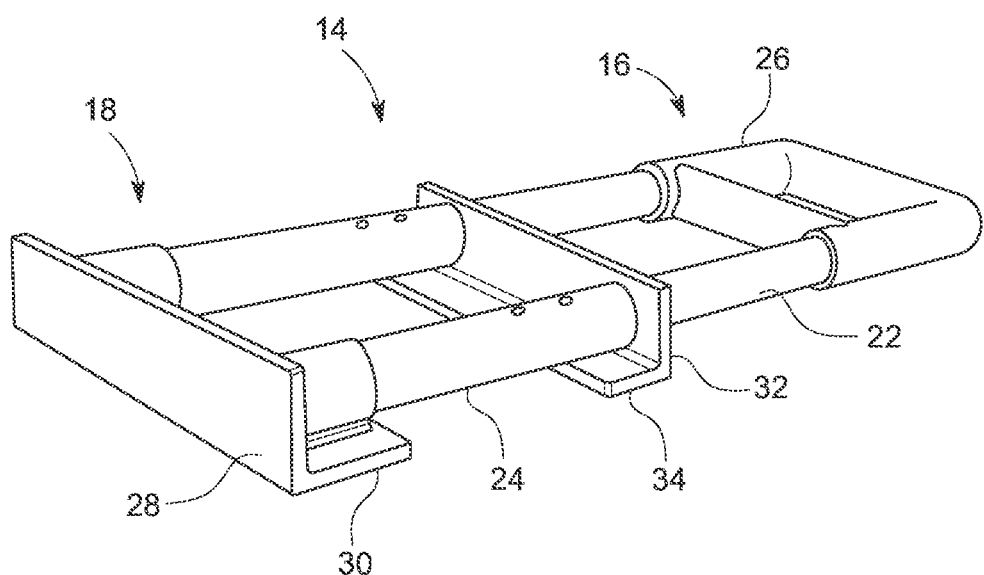
FIG. 4 is perspective view of a variation the extendable slide assembly of FIGS. 1 and 2 in a retracted position, wherein a second lock or drawer handle latch is eliminated.
Figure 5:
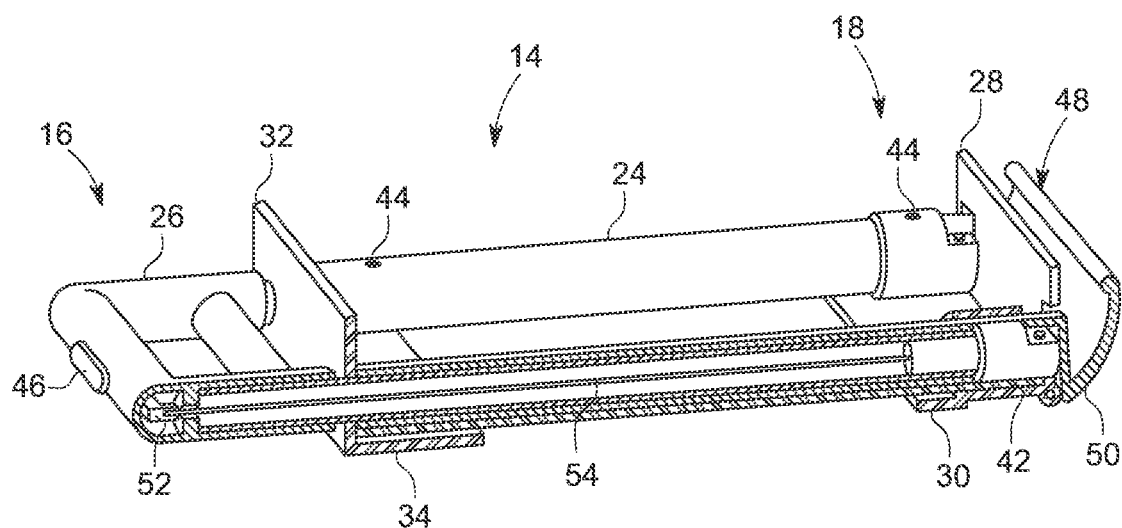
FIG. 5 is perspective view of the extendable slide assembly which is similar to FIG. 4 but is viewed from the opposite direction and is cross-sectioned.

FIGS. 4 and 5 illustrate an exemplary extendable slide assembly 14 which includes two pairs of laterally spaced-apart and parallel telescoping first and second extendable members 22, 24 extending between the first end 16 and the second end 18. Alternatively, the extendable slide assembly 14 can include only one pair or more than two pairs telescoping first and second extendable members 22, 24. The first and second extendable members 22, 24 are connected together in a telescoping member so that they are extended and retracted between a fully retracted position and fully extended position. The illustrated first and second extendable members 22, 24 are each rigid, elongate hollow tubes having circular cross-sections with the first extendable members 22 having a smaller outer diameter than the second extendable members 24 so that the first extendable members 22 are received within in the second extendable members 24 in a telescoping manner. The first and second extendable members 22, 24 can be formed of any suitable material. The first and second extendable members 22, 24 can alternatively have any other suitable shape, cross-sectional shape, and/or configuration.

A first end connector 26 connects the first or rearward end of each of the first extendable members together 22. The illustrated first end connecter 26 has a pair of forward facing and laterally spaced-apart sockets for receiving the rearward ends of the first extendable members 22. The first end connector 26 is configured as a hollow handle but any other suitable shape can alternatively be utilized. The illustrated first end connector or handle 26 has a pair of laterally spaced-apart side portions forming the sockets, a laterally extending first cross portion connecting the first or rearward ends of the side portions, and a laterally extending second cross portion connecting the side portions at or near the second or forward ends of the side portions. The first cross portion is preferably sized and shaped to be grasped by hand to be used as a handle when the extendable slide assembly 14 is not secured to the support bracket 20. The first end connector 26 can be formed of any suitable material. The first end connector 26 can alternatively have any other suitable configuration.

A second end connector 28 connects the second or forward end of each of the second extendable members together 24. The illustrated second end connecter 28 has a pair of rearward facing and laterally spaced-apart sockets for receiving the forward ends of the second extendable members therein 14. The second end connector 28 also has a laterally extending cross portion or bracket connecting the second or forward ends of the sockets. The top and/or bottom of the illustrated cross portion is provided with a flange 30 for supporting the storage container 12 depending on the specific application as described in more detail hereinbelow. The illustrated flange 30 is perpendicular to the cross portion and provides an outer surface that is generally planer for supporting the storage container 12. If desired, the flange 30 can be provided fastener openings or any other suitable fastening means for fixing or removably securing the storage container 12 to the flange 30. The second end connector 28 can be formed of any suitable material. The second end connector 28 can alternatively have any other suitable configuration.

An intermediate connector 32 connects the first or rearward end of each of the second extendable members together 24. The illustrated intermediate connecter 32 has a laterally extending cross portion or bracket connecting the first or rearward ends of the second extendable members 24. The top and/or bottom of the illustrated cross portion is provided with a flange 34 for supporting the storage container 12 depending on the specific application as described in more detail hereinbelow. The illustrated flange 34 is perpendicular to the cross portion and provides an outer surface that is generally planer for supporting the storage container 12. If desired, the flange 34 can be provided with fastener openings or any other suitable fastening means for fixing or removably securing the storage container 12 to the flange 34. The intermediate connector 32 can be formed of any suitable material. The intermediate connector 32 can alternatively have any other suitable configuration.

The illustrated flanges 30, 34 of the second end connector 28 and the intermediate connector 32 cooperate to form a generally planer support surface for the storage container 12. With the flanges 30, 34 located at the top (best shown in FIG. 3), the storage container 12 can be supported directly on top of the flanges 30, 34. With the flanges 30, 34 located at the bottom (best shown in FIGS. 1 and 2), the flanges 30, 34 can be fixed or removably secured to an upward facing surface within the storage container 12 to support the storage container 12 through the flanges 30, 34. The flanges 30, 34 can alternatively have any other suitable, size, shape or configuration.

Figure 6:
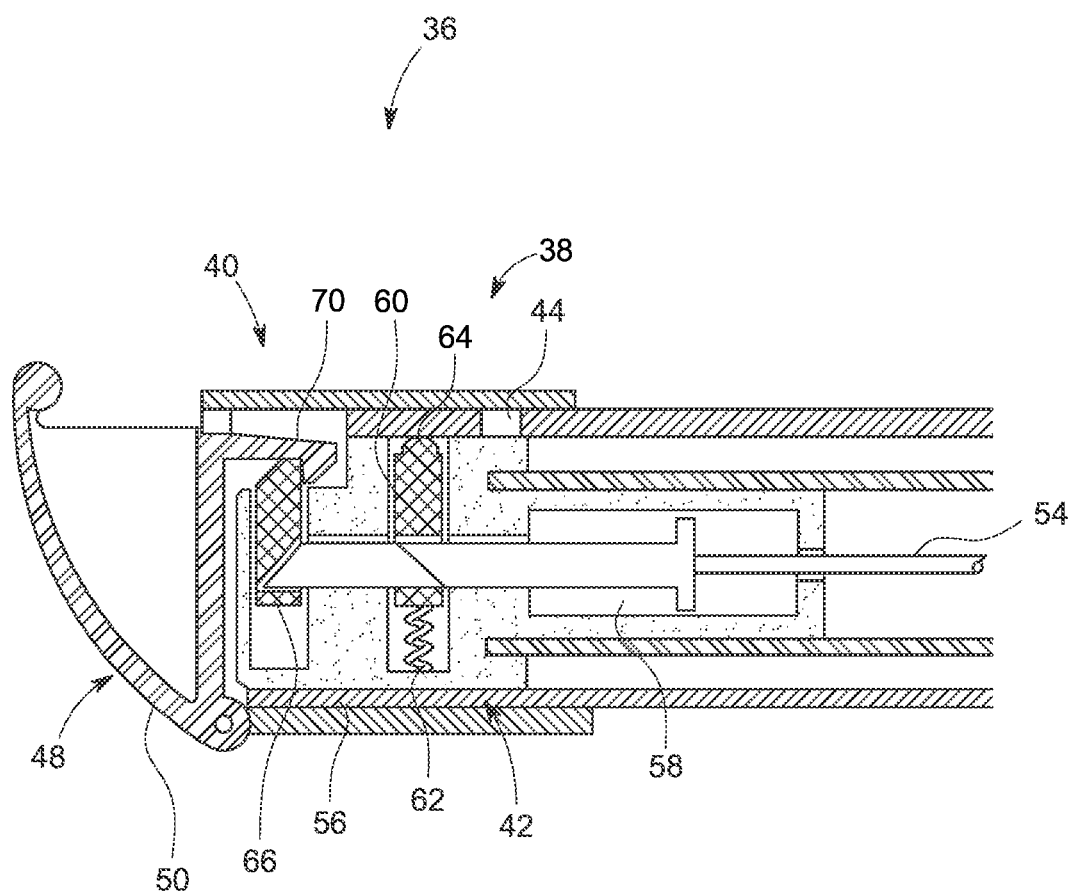
FIG. 6 is fragmented and enlarged cross-sectional view of a dual handle latch and slide stop assembly of the extendable slide assembly of FIG. 5.
Figure 7:
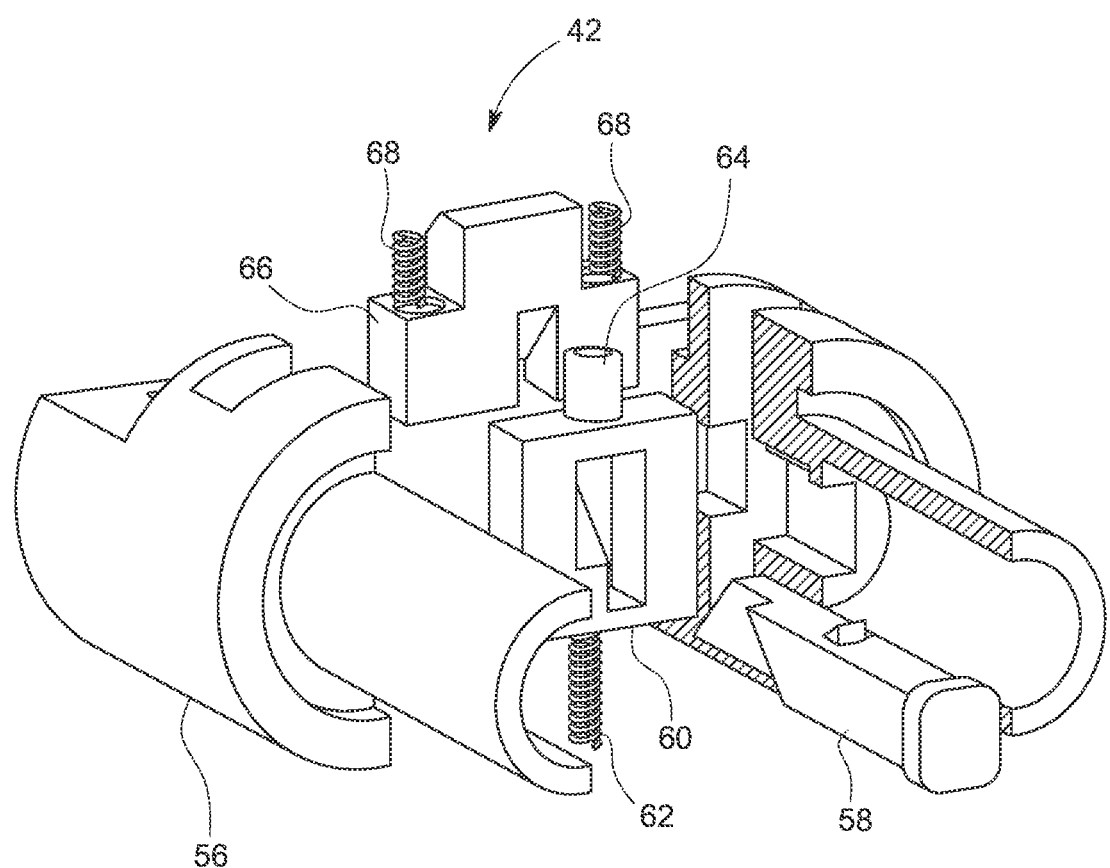
FIG. 7 is an exploded perspective view of the slide stop assembly of the dual handle latch and slide stop assembly of FIG. 6.

As best shown in FIGS. 5 to 7, the illustrated extendable slide assembly 14 also includes a dual lock system 36 having a first lock 38 and a second lock 40. The illustrated first lock 38 is in the form of slide stop assembly 42. The illustrated first lock 38 prevents relative movement between the first and second extendable members 22, 24 when the first lock 38 is locked at predetermined positions and permits relative movement between the first and second extendable members 22, 24 when the first lock 38 is unlocked or released. The illustrated predetermined positions are at a substantially fully retracted position and at a substantially fully extended position and are defined by apertures 44 through the top of the second extendable members 24. It is noted that alternatively, different or additional positions can be utilized or alternatively the first lock can be configured to provide locking at infinite positions. The first lock 38 includes a first actuator 46 which can be manually activated or actuated to release the first lock 38. The illustrated first actuator 46 is a release button that unlocks the first lock 38 when depressed. The illustrated first actuator 46 is located at the rearward end of the first end connector or handle 26. Configured in this manner, the first lock 38 can be used to adjust the extendable slide assembly 14 between extended and retracted positions and lock the extendable slide assembly 14 in a desired on of the predetermined positions as desired when the extendable slide assembly 14 is not secured to the support bracket 20. However, when the extendable slide assembly 14 is secured to the support bracket 20, the first actuator 46 is automatically actuated to unlock the first lock 38 so that the extendable slide assembly 14 freely extends and retracts except when the second lock 40 is locked as described hereinbelow.

The illustrated second lock 40 is drawer handle latch assembly 48. The illustrated second lock 40 prevents relative movement between the first and second extendable members 22, 24 when the second lock 40 is locked and the first and second extendable members 22, 24 are in a fully retracted position and permits relative movement between the first and second extendable members 22, 24 when the second lock 40 is unlocked or released and the extendable members 22, 24 are not in their fully retracted position. It is noted that alternatively different or additional locking positions can be utilized or alternatively the second lock can be configured to provide locking at infinite positions. The second lock 40 includes a second actuator 50 which can be manually activated or actuated to release the second lock 40. The illustrated second actuator 50 is a pivoting drawer handle that unlocks the second lock 40 when pulled as described in more detail hereinbelow. The illustrated second actuator 50 is located at the forward end of the second end connector 28. Configured in this manner, the second lock 40 can be used to lock the extendable slide assembly 14 in a fully retracted position when the extendable slide assembly 14 is secured to the support bracket 20 and the extendable slide assembly 14 is unlocked and fully adjustable when not in the fully retracted position. However, when the extendable slide assembly 14 is not secured to the support bracket 20, the first lock 38 is utilized to lock the position of the extendable slide assembly 14 as described hereinabove. The second lock 40 can alternatively have any other suitable configuration. It is noted that the second lock 40 can be eliminated if desired (best shown in FIG. 4).

As best shown in FIGS. 5 to 7, the illustrated first lock 38 includes the release button 46 which is spring biased in a rearward direction to its unactuated or undepressed position. Rigid arms 52 extend laterally outward from the release button 46 to the forward-facing sockets of the first connecting member 26. The rigid arms 52 move with the release button 46 as it is depressed and returned. A rigid rod 54 extends from each outer end of the arms 52, through the first extendable members 22 to the slide stop assembly 42 located at the rearward ends of the first extendable members 22. The rigid rods 54 move with the rigid arms 52 and the release button 46 as the release button 46 is depressed and returned. Only one of the slide stop assemblies 42 will be described because they are each the same in the illustrated embodiment. The illustrated slide stop assembly 42 includes a stop housing 56 secured to the forward end of the first extendable member 22 for movement therewith within the second extendable member 24. The stop housing 56 is sized for close sliding receipt within the second extendable member 24. A brake cam member 58 is positioned within the stop housing 56 for axial movement therein in the forward/rearward direction. The forward end of the rigid rod 54 is secured to the rearward end of the cam member 58 such that the cam member 58 axially moves with the rigid rod 54 upon depression and return of the release button 46. The cam member 58 has a first cam surface and a second cam surface located forward of the first cam surface. The first cam surface is angled and downward facing to cooperate with a cam surface of a brake block 60. The brake block 60 is biased in an upward direction by a helical coil compression spring 62 located below the brake block 60. The cam surface of the brake block 60 is angled and upward facing so that movement of the cam member 58 in the forward direction moves the brake block 60 down against the bias of the spring 62. The upper side of the brake block 60 is provided with a vertically extending lock pin 64. When the release button 46 is undepressed, the lock pin 64 is biased upwardly so that when it aligns with one of the apertures 44 in the second extendable member 24 and the lock pin is 64 pushed up through the aperture to prevent sliding movement of the second extendable member 24 relative to the first extendable member 22. When the release button 4 is depressed, the cam member 58 is moved in the forward direction to downwardly cam the brake block 60 remove the lock pin 64 from the aperture 44 to permit sliding movement of the second extendable member 24 relative to the first extendable member 22.

As best shown in FIGS. 6 and 7, the illustrated second lock 40 includes a latch block 66 located at a forward end of the stop housing 56. The latch block 66 is biased in a downward direction by a pair of helical coil compression springs 68 located above the latch block 66. The latch block 66 has a cam surface that is angled and downward facing to cooperate with the second cam surface of the cam member 58 so that movement of the cam member 58 in the forward direction moves the latch block 66 up against the bias of the springs 68. The upper side of the latch block 66 is provided with rearward facing latch abutment which cooperates with a latch hook 70 of the pivoting drawer handle 50 and having a forward facing abutment. When the release button 46 is undepressed, the latch abutment of the latch block 66 is biased downwardly so that it cannot interact with the latch hook 70. When the release button 46 is depressed, the cam member 58 is moved in the forward direction to upwardly cam the latch block 66 in an upwardly direction so that it can interlock with the latch hook 70 when the first and second extendable members 22, 24 are fully retracted to prevent sliding movement of the second extendable member 24 relative to the first extendable member 22. When it is desired to extend the extendable members 22, 24 from this position, the pivoting drawer handle 50 is pulled so that it pivots forwardly to disengage the latch hook 70 from the latch block 66. Further pulling of the drawer handle 50 moves the second extendable members 24 relative to the first extendable members 22 to extend the extendable slide assembly 14. The latch hook 70 and the latch block 66 are provided with cooperating cam surfaces so that the latch block 66 is downwardly moved against the bias of the springs 68 upon contact during rearward movement of the second extendable members 24 relative to the first extendable members 22 to the fully retracted position so that the latch hook 70 can lock with abutment of the latch block 66 once it passes by the latch block 66 and the latch block 66 is biased back into position by the springs 68.

Figure 8:
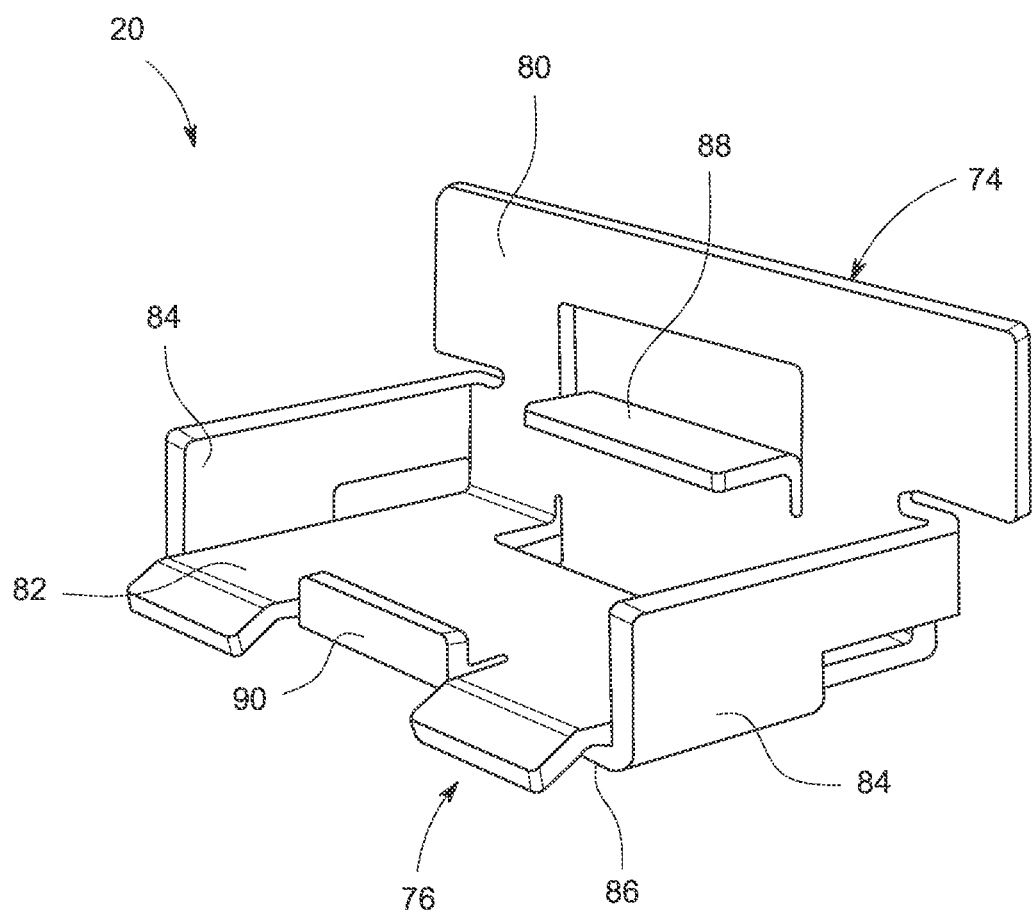
FIG. 8 is a perspective view of the support bracket of FIGS. 1 and 2.

FIG. 8 illustrates an exemplary support bracket 20 for supporting the extendable slide assembly 14 from a support 72 in a cantilevered manner. The support 72 can be any suitable support such as, for example but not limited to, a vertically extending wall or surface, a frame, a vehicle, and the like. The support bracket 20 receives the first end 16 of the extendable slide assembly 14 such that the second end 18 of the extendable slide assembly 14 is the free end. The illustrated support bracket 20 includes a mounting portion 74 configured to be secured to the support 72 and an attachment portion 76 supported by the mounting portion 74. The attachment portion 76 can be provided with fastener openings 78 if desired (best shown in FIGS. 1 and 2). The illustrated attachment portion 76 is configured to removably receive the first end 16 of the extendable slide assembly 14 supporting the storage container 12 to support the storage container 12 through the extendable slide assembly 14 and to automatically actuate the first actuator 46 of the first lock 38 to unlock the first lock 38. Thus, the storage container 12 is free to be moved toward the attachment portion 76 of the support bracket 20 when the extendable slide assembly 14 is extended and the storage container 12 is free to be moved away from the attachment portion 76 of the support bracket 20 when the extendable slide assembly 14 is retracted and the second lock 40 is unlocked.

The illustrated the support bracket 20 has a vertically extending rear wall 80 connected through a bend to a horizontally extending bottom wall 82 forwardly extending from a bottom edge of the rear wall 80. A pair of opposed vertically extending side walls 84 forwardly extend for the lateral edges of the rear wall 80 through bends at the lateral edges of the rear wall 80. The illustrated side walls 84 each include a support tab 86 that is bent under the bottom wall 82 from bottom edges of the side walls 84. A first stop tab 88 is forwardly bent from the rear wall 80 to form a downward facing first stop or abutment located above and facing the top surface of the bottom wall 82. The first end connector 26 of the extendable slide assembly 14 is placed between the bottom wall 82 and the first abutment to limit upward movement of the first end connector 26 relative to the support bracket 20. The bottom wall 82 and the first abutment are spaced apart a distance that enables the first end connecter 26 to be inserted therebetween but minimizes relative movement between the first end connector 26 and the support bracket 20. A second top tab 90 is upwardly bent from a front edge of the bottom wall 82 to form a generally rearward facing second stop or abutment located in front of and facing the front surface of the rear wall 80. The first end connector 26 of the extendable slide assembly 14 is placed between the rear wall 80 and the second abutment to limit forward movement of the first end connector 26 relative to the support bracket 20. The rear wall 80 and the second abutment are spaced apart a distance that enables the first end connecter 26 to be inserted and removed but minimizes relative movement between the first end connector 26 and the support bracket 20 and enables the rear wall 80 to automatically depress the release button 46 of the first lock 38. With the first end connector 26 removably secured in this manner, the extendable slide assembly 14 forwardly and horizontally extends from the support bracket 20 and can be extended and retracted with the first lock 38 automatically unlocked. The illustrated support bracket 20 is formed of bent sheet metal but it is noted that the support bracket 20 can alternatively be formed of any other suitable material and/or formed by any other suitable method. The support bracket 20 can alternatively have any other suitable configuration.

Figure 9:
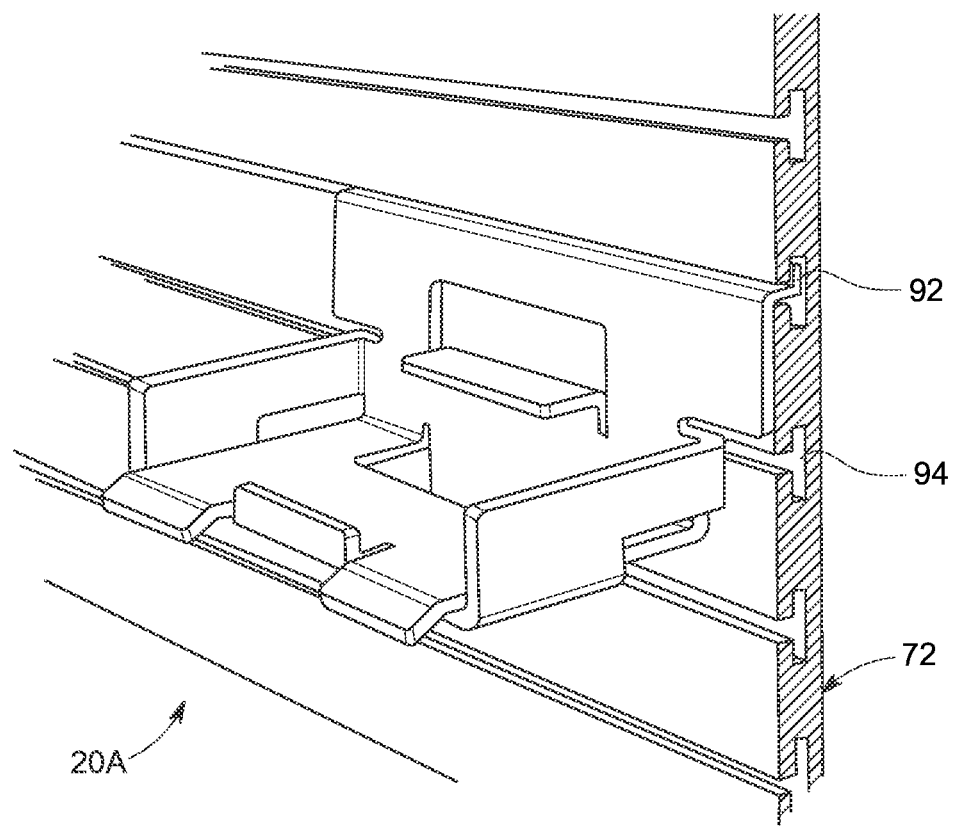
FIG. 9 is a perspective view of support bracket according to a first alternative embodiment, wherein the support bracket is mounted to a slotted support wall.

FIG. 9 illustrates a first alternative embodiment of the support bracket 20A. The first alternative support bracket 20A is substantially the same as the support bracket 20 described hereinabove except that the first alternative support bracket 20A is configured for use with a support 72 in the form of a slotted support wall. The first alternative support bracket 20A includes at least one tab 92 bent from the top edge of the rear wall 80 and configured to be inserted into a standard T-shaped slot 94. The illustrated tab 92 has a horizontal portion rearwardly extending from a bend at the top edge of the rear wall 80 and a vertical portion upwardly extending from a bend at the rear edge of the horizontal portion. The illustrated first alternative support bracket 20A is formed of bent sheet metal but it is noted that the support bracket 20A can alternatively be formed of any other suitable material and/or formed by any other suitable method. The first alternative support bracket 20A can alternatively have any other suitable configuration.

Figure 10:
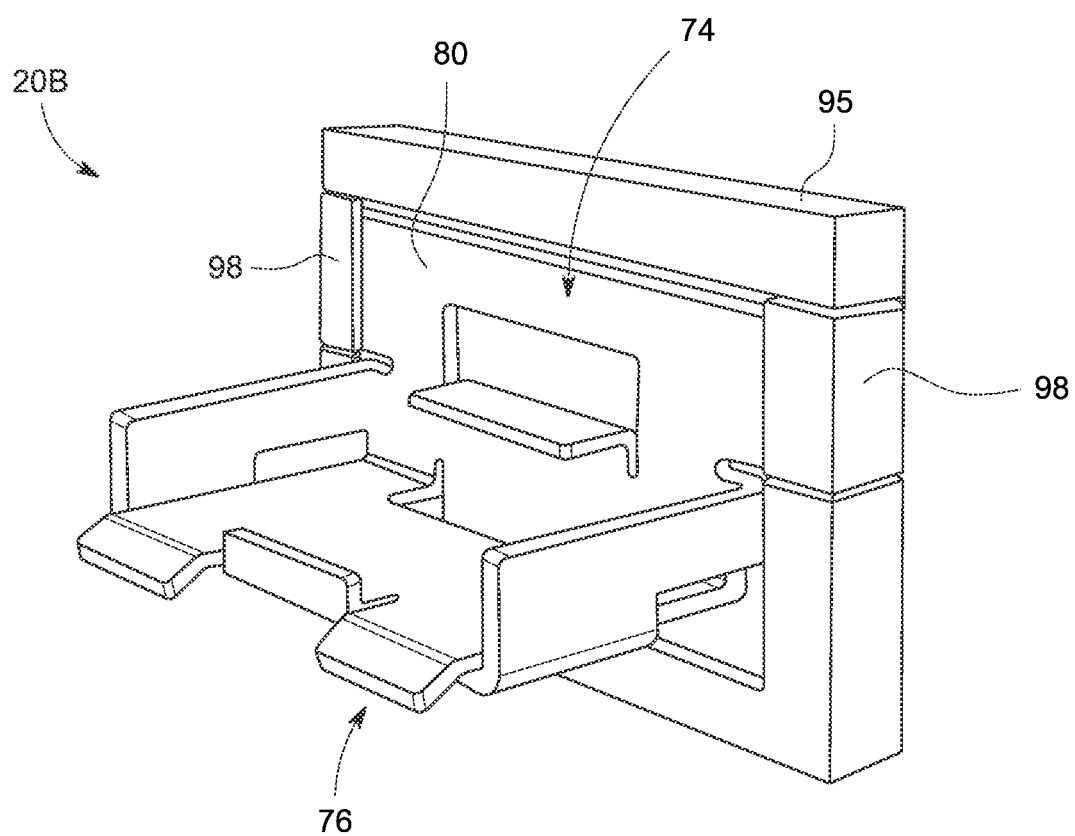
FIG. 10 is a perspective view of a support bracket according to a second alternative embodiment.
Figure 11:
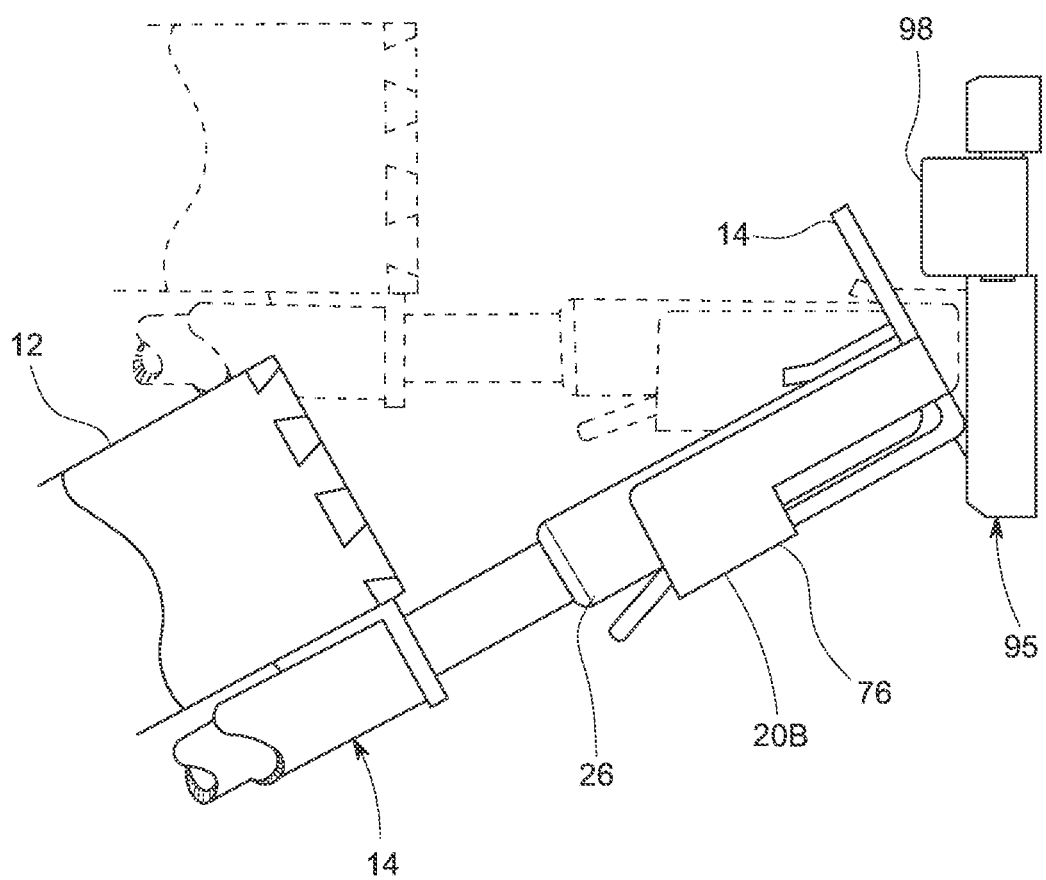
FIG. 11 is a side elevation view of the support bracket of FIG. 10, wherein a hinged portion of the support bracket is released.
Figure 12:
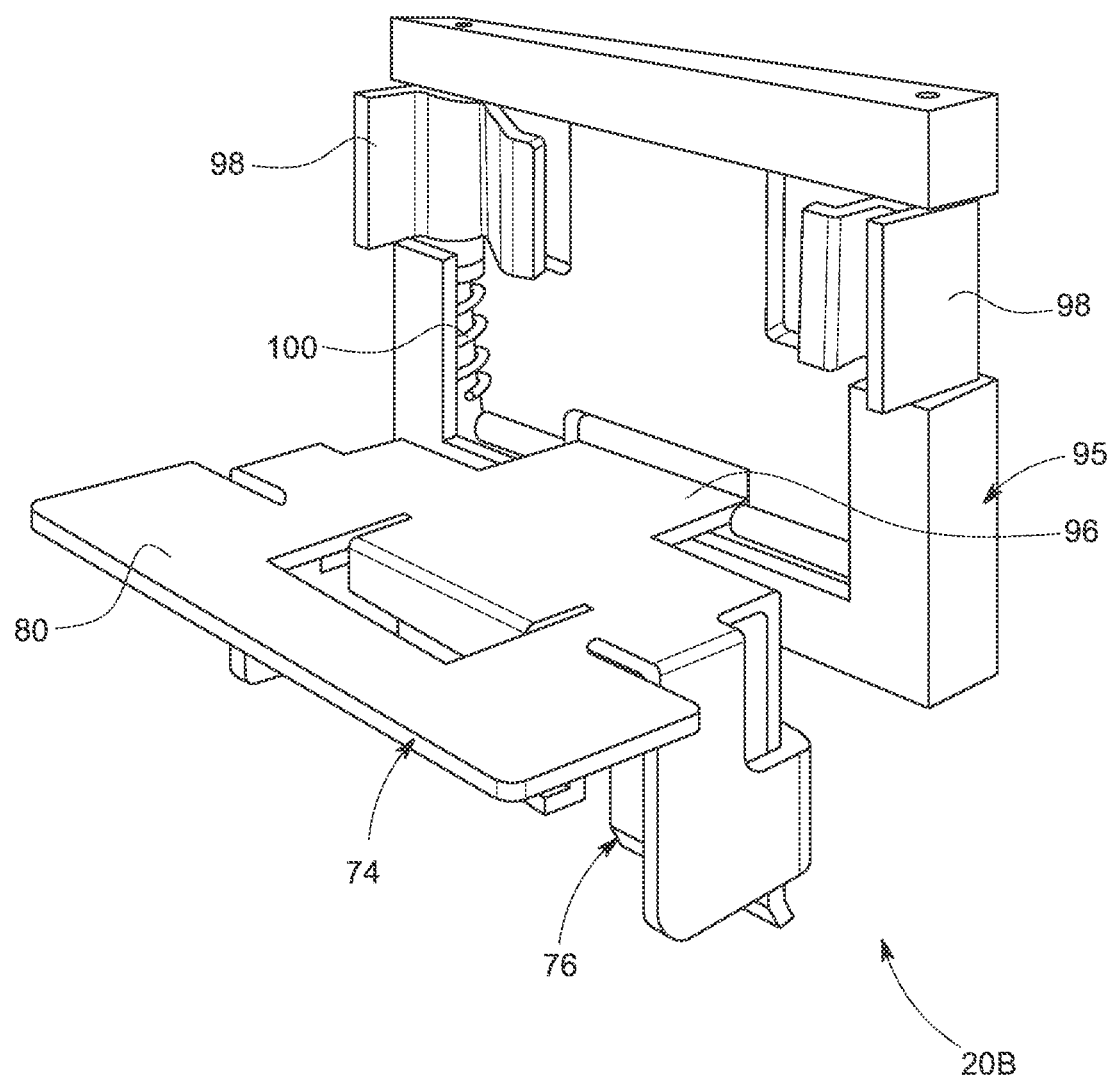
FIG. 12 is a perspective view of the support bracket of FIG. 10, wherein the hinged portion of the support bracket is released.

FIGS. 10 to 12 illustrate a second alternative embodiment of the support bracket 20B. The second alternative support bracket 20B is substantially the same as the support bracket 20 described hereinabove except that the mounting portion 74 is pivotably attached to a mounting frame 95 to provide a break-away feature. The illustrated mounting frame 95 is configured to be secured to the support 72 and an mounting portion 74 is pivotably attached to the support portion with a hinge 96 at its lower end so that the support bracket 20B pivots outwardly and downwardly from the mounting frame 95 when a predetermined break-away load is applied to the support bracket 20B. The predetermined break-away load can be, for example, about 50 pounds, but any other suitable predetermined load limit can alternatively be utilized. The break-away feature aids in preventing tip overs (along with the second lock) and aids in preventing damage to the extendable slide assembly 14 when higher than designed for loads are placed in or on the storage container 12. The illustrated mounting frame 95 includes a pair of opposed spring-loaded pivoting holding members 98 that extend in front of upper portions of the rear wall 80 of the mounting portion 74 of the support bracket 20B to hold the support bracket 28B in its upright position for use. When load on the support bracket 28B over comes the springs 100 biasing the holding members 98, the holding members 98 pivot about their vertical pivot axes causing the support bracket 28B to pivot downwardly bout its horizontal pivot axis to unload the support bracket 28B. The springs 100 are selected to provide the predetermined load limit. It is noted that second alternative support bracket 28B can alternatively have any other suitable configuration.

Figure 13:
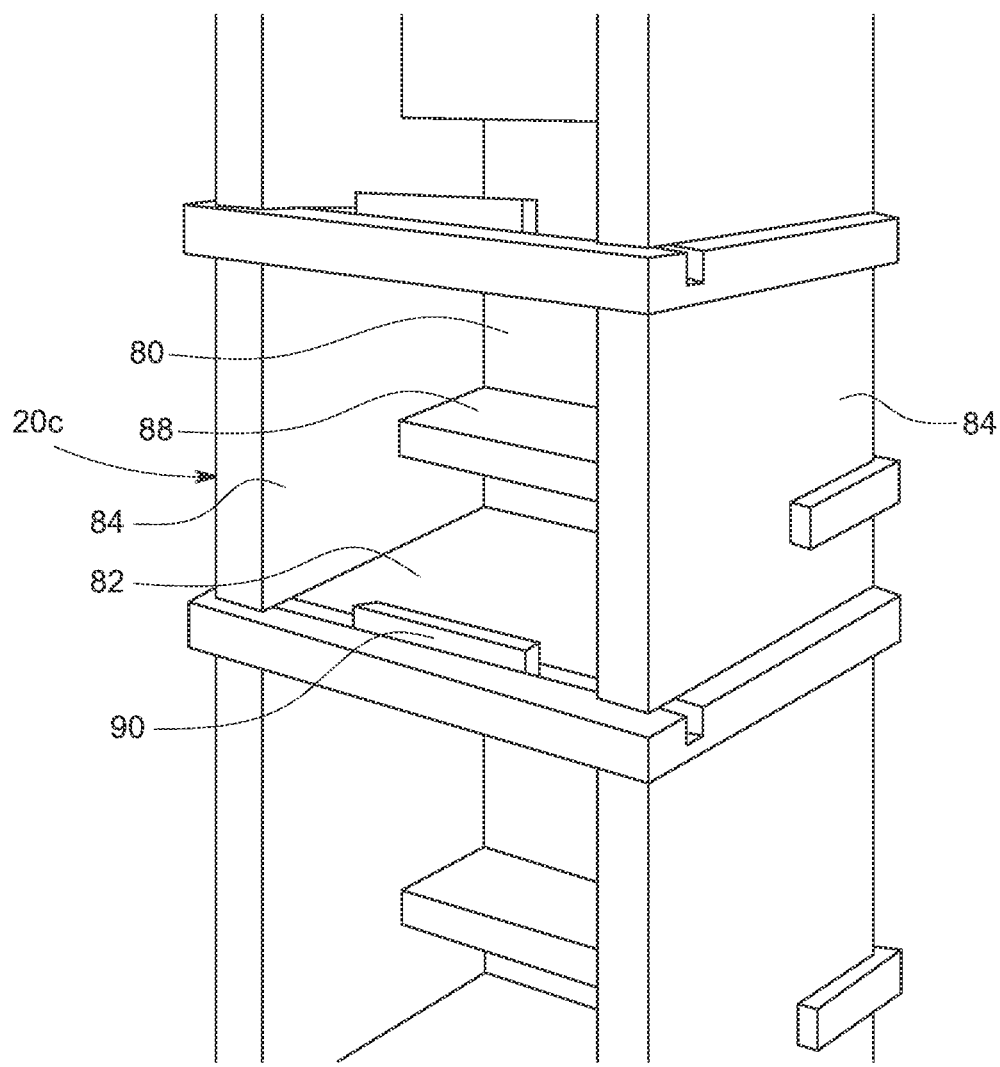
FIG. 13 is a perspective view of a support bracket according to a third alternative embodiment.

FIG. 13 illustrates a third alternative embodiment of the support bracket 20C. The third alternative support bracket 20C is substantially the same as the support bracket 20 described hereinabove except that the support bracket 20C is formed of wood panels or the like secured together. The third alternative support bracket 20C also illustrates that a plurality of the support brackets 20C can be formed together one above the other. It is noted that the third alternative support bracket 20C can alternatively have any other suitable configuration.

The storage container or compartment 12 can be of any suitable type. For example, but not limited to, bags, baskets, bins, boxes, buckets, cabinets, caddies, canisters, cans, chests, coolers, crates, cubes, drawers, luggage, suitcases, trunks, totes, tubs, and the like. The storage container or compartment 12 can also comprise any suitable material, for example, but not limited to, metal, plastic, rubber, cardboard, glass, wood, fabric, and the like.

Figure 14:
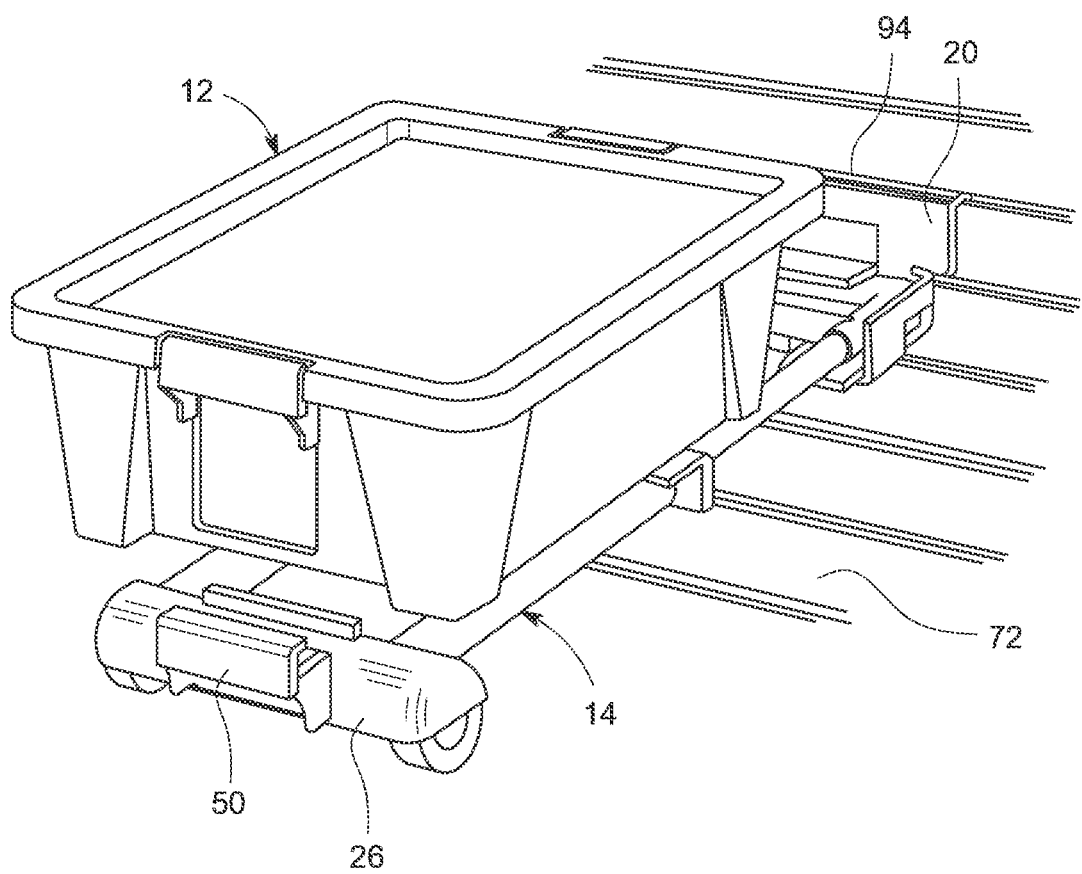
FIG. 14 is a perspective view of support system for a storage container according to another embodiment of the present invention, wherein the storage container is a storage tote removably supported on the extendable slide assembly of FIG. 2, and the support bracket of FIG. 9 is removably secured to a slotted wall and removably supporting the extendable slide assembly in a cantilevered manner.

FIG. 14 illustrates a first exemplary application the support system 10 according to the present invention. The storage container 12 is a storage tote removably supported on top of the extendable slide assembly 14. The extendable slide assembly 14 is removably secured to the support bracket 20 and cantilevered therefrom. The support bracket 20 is removably secured to a support 72 in the form of a slotted wall.

Figure 15:
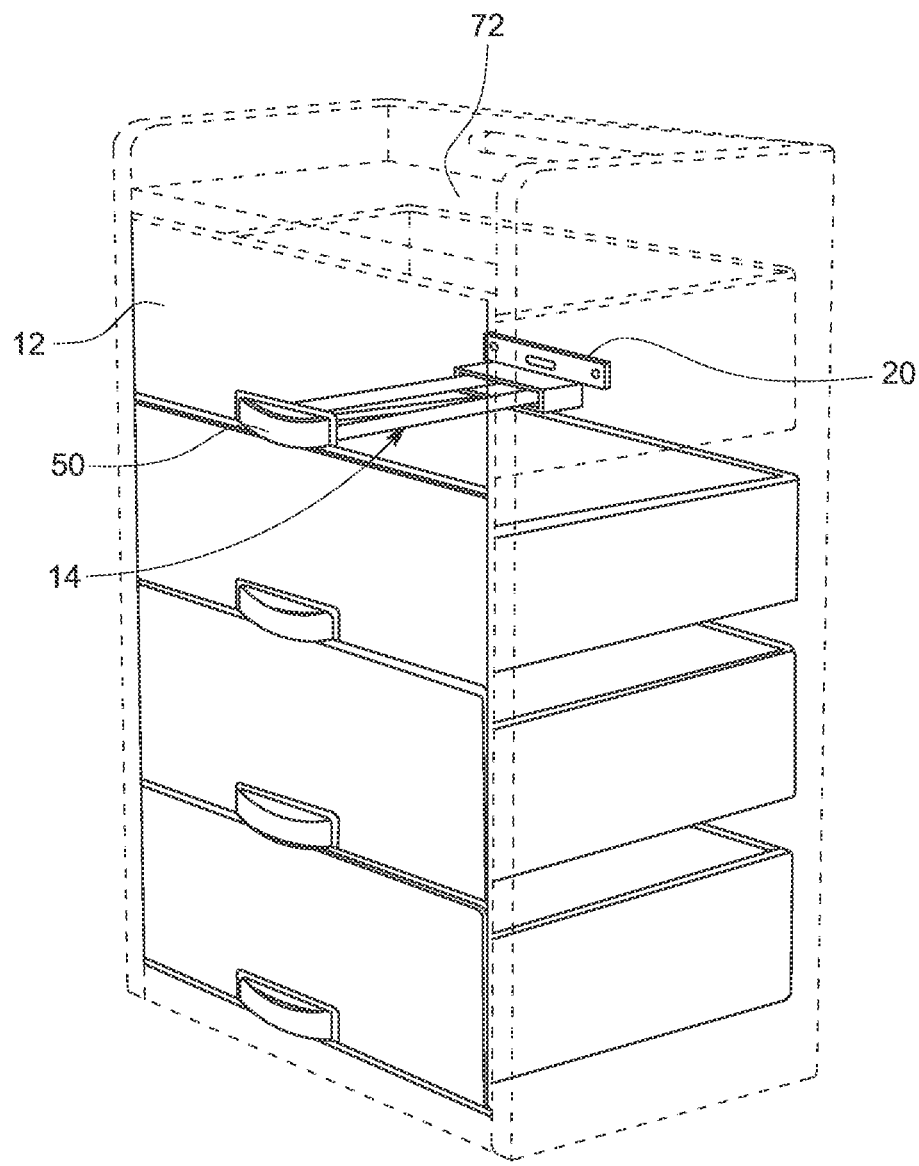
FIG. 15 is a perspective view of support system for a storage container according to another embodiment of the present invention, wherein the storage container is drawer secured to and supported by the extendable slide assembly of FIG. 2 and the support bracket of FIG. 8 is secured to a rear wall of a dresser and removably supporting the extendable slide assembly in a cantilevered manner.

FIG. 15 illustrates a second exemplary application the support system 10 according to the present invention. The illustrated storage container 12 is a box-shaped drawer with an open top side to access the interior space. The illustrated drawer has the flanges of the intermediate and second connectors of the extendable slide assembly 14 located therein and rigidly fixed thereto to prevent relative movement therebetween. A front opening is provided in a front side of the illustrated drawer to provide access to the drawer handle 50 of the second lock 40. A rear clearance opening is provided in a rear side of the illustrated drawer so that the first extendable members 24 of the extendable slide assembly 14 can pass therethrough. It is noted that the rear clearance opening is configured so that at least a portion of the support bracket 20 can pass therethrough so the rear of the draw can be selectively positioned near the rear support wall 72 to which the support bracket 20 is mounted. It is noted that the drawer/dresser can alternatively have any other suitable configuration.

Figure 16:
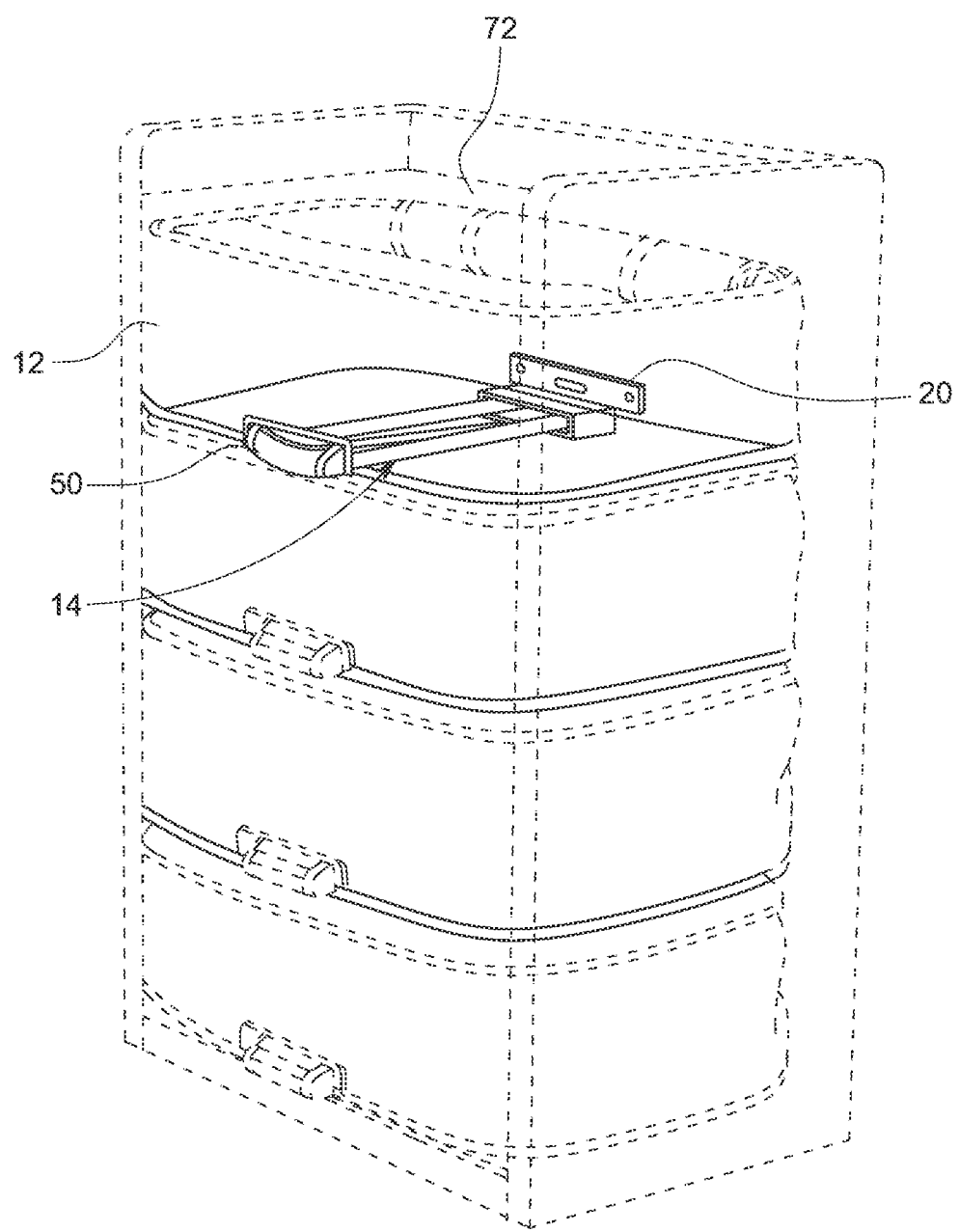
FIG. 16 is a perspective view of support system for a storage container according to another embodiment of the present invention, wherein the storage container is a suitcase with the extendable slide assembly of FIG. 1 extending therethrough and the support bracket of FIG. 8 is removably secured to a rear wall of a dresser and removably supporting the extendable slide assembly in a cantilevered manner.

FIG. 16 illustrates a third exemplary application the support system 10 according to the present invention. The illustrated storage container 12 is a suitcase and the extendable slide assembly 14 provides an extendable handle of the suitcase. The term "suitcase" is used herein and in the claims to mean a portable form of luggage with a handle so that the luggage can be hand carried by the traveler, and can be a wheeled suitcase or a non-wheeled suitcase, a soft sided suitcase or a hard sided suitcase, and an expandable suitcase or a non-expandable suitcase. The term "luggage is used herein and in the claims to mean bags, cases, and other containers 12 which store a traveler's articles such as clothing, toiletries, and other small personal items during transit. The support brackets 20 are secured to a rear wall 72 of a dresser so that the suitcases can be removably secured to the support brackets 20 so that the suitcases can be utilized as dresser drawers. The illustrated suitcases have removable or partially removable top walls to provide easy access into the suitcases when secured in this manner. It is noted that the suitcases/dresser can alternatively have any other suitable configuration.

Figure 17:
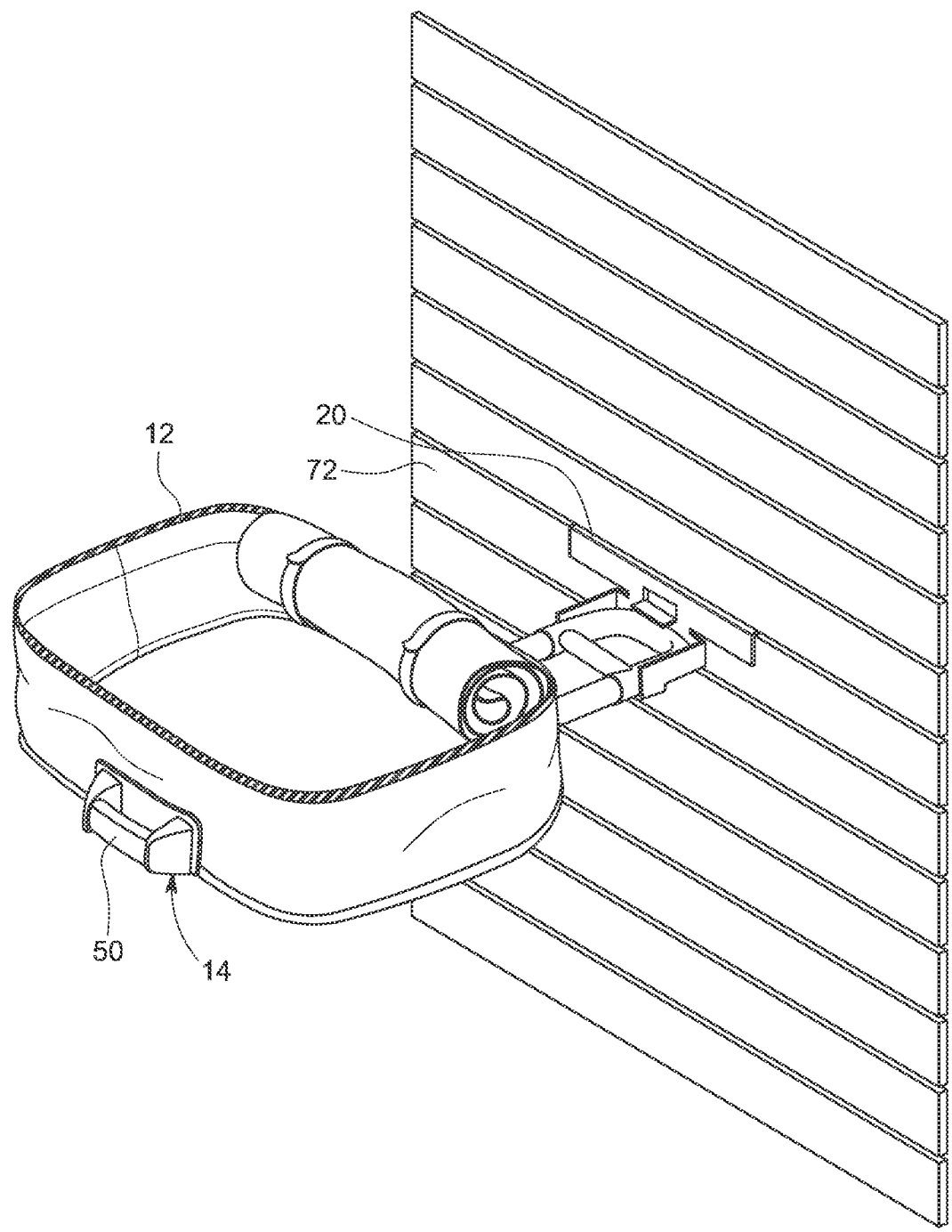
FIG. 17 is a perspective view of support system for a storage container according to another embodiment of the present invention, wherein the storage container is a suitcase with the extendable slide assembly of FIG. 1 extending therethrough and the support bracket of FIG. 9 is removably secured to a slotted wall and removably supporting the extendable slide assembly in a cantilevered manner.

FIG. 17 illustrates a fourth exemplary application the support system 10 according to the present invention. This application illustrates that support bracket 20 can be mounted to a wall 72 within a room such as, for example but not limited to, a hotel room. With the support bracket 20 mounted in this manner, a hotel guest can temporarily secure their suitcase to the support bracket 20 during their stay. It is noted that the room can alternatively be any other suitable type of room and that there can alternatively be any other suitable quantity and/or locations of the support brackets 20. The illustrated suitcases have removable or partially removable top walls to provide easy access into the suitcases when secured in this manner. It is noted that the suitcases/support wall can alternatively have any other suitable configuration.

Figure 18:
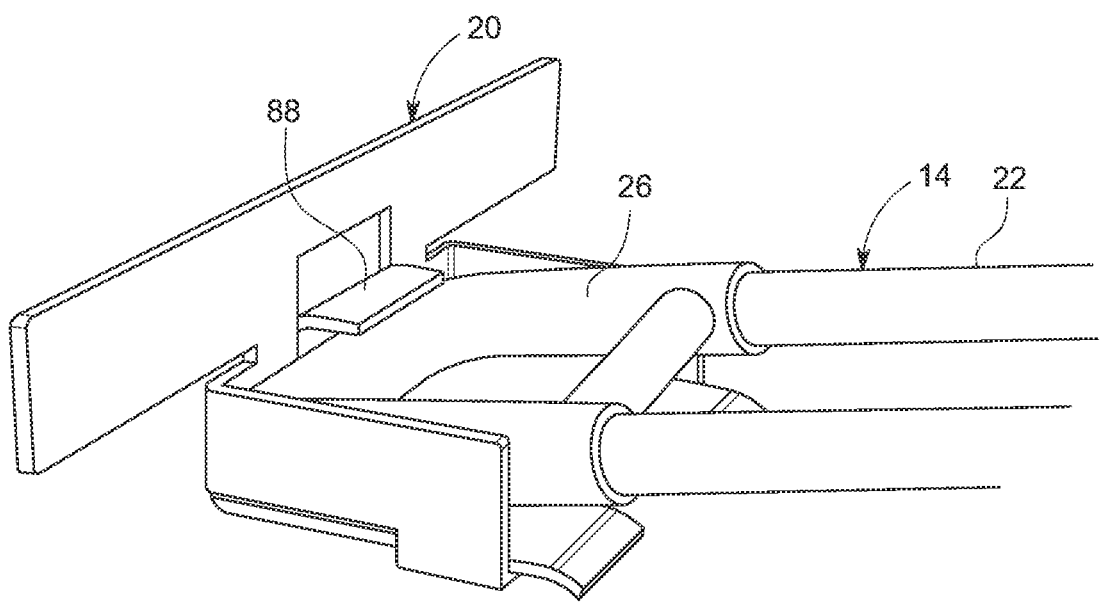
FIG. 18 is a right-side perspective view of the support bracket of FIG. 1 partially receiving a handle or connecting end of the extendable slide assembly of FIG. 1.
Figure 19:
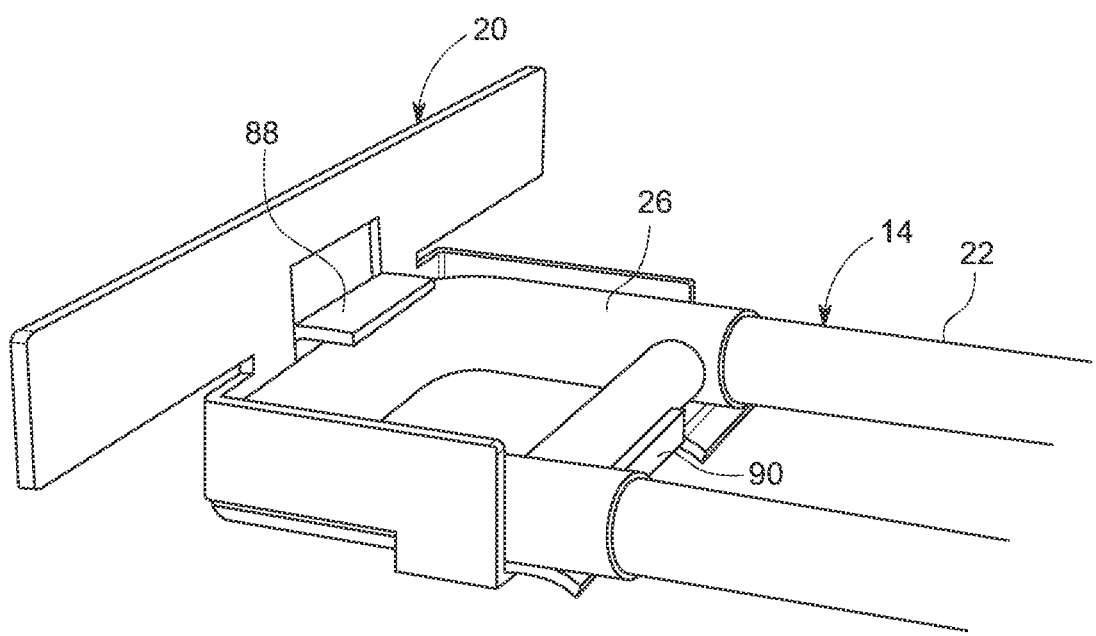
FIG. 19 is a perspective view similar to FIG. 19 but with the support bracket fully receiving the handle or connecting end of the extendable slide assembly so that the support bracket removably supports the extendable slide assembly in a cantilevered manner.

To removably secure the extendable slide assembly 14 to the support bracket 20, the first end 16 of the extendable slide assembly 14 is lowered toward the support bracket 20 in an angled manner in a rearward direction (best shown in FIG. 18). The first end connector 26 of extendable slide assembly 14 is moved rearward until it is fully rearward and the first end connector 26 is on the bottom wall 82 and below the first abutment of the first stop tab 88 (best shown in FIG. 18). The first end connector 26 is then lowered so that the first end connector 26 is located between the second abutment of the second stop tab 90 and the rear wall 80 with the release button 46 of the first lock 38 depressed against the rear wall 80 (best shown in FIG. 19). With the first end connector 26 of the extendable slide assembly 14 removably secured to the support bracket 20 in this manner, the storage container 12 is fully supported by the support bracket 20 through the extendable slide member in a cantilevered manner. It is noted that the components of the extendable slide assembly 14 must be configured to support the weight of the container 12 and its contents in this manner. The first end connector 26 can be easily removed from the support bracket by reversing the above described steps for insertion.

Any of the features or attributes of the above-described embodiments and variations can be used in combination with any of the other features and attributes of the above-described embodiments and variations as desired.

From the foregoing disclosure it will be apparent that the illustrated storage container support systems and methods provide greatly improved versatility and simplified, safe and economic transport and/or storage of personal items and other goods.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A storage container support system comprising, in combination:
    a storage container;
    an extendable slide assembly having a first end and a second end, wherein the second end moves away from the first end and toward the first end respectively when the extendable slide assembly is extended and retracted;
    wherein the first end of the extendable support assembly includes a handle;
    wherein the second end of the extendable slide assembly is configured to support the storage container;
    a support bracket including a mounting portion and an attachment portion supported by the mounting portion, wherein the attachment portion of the support bracket includes: at least one downward facing abutment forward of the mounting portion and configured to limit upward movement of the first end of the extendable slide assembly; at least one upward facing abutment forward of the mounting portion and configured to limit downward movement of the first end of the extendable slide assembly, wherein the upward facing abutment is located below the downward facing abutment and extends further forward from the attachment portion than the downward facing abutment; and pair of opposed side abutments forward of the mounting portion and configured to limit lateral movement of the first end of the extendable slide assembly, wherein at least a portion of the at least one downward facing abutment and the at least one upward facing abutment is located between the pair of side abutments, wherein the attachment portion is configured to selectively and removably receive the handle of the first end of the extendable slide assembly to support the extendable slide assembly in a cantilevered manner such that the second end of the extendable slide assembly is a free end supporting the storage container; and
    wherein the handle is configured to be grasped to move the storage container when the handle is not received by the support bracket.

2. The storage container support system according to claim 1, wherein the second end of the extendable support assembly is fixed to the storage container.

3. The storage container support system according to claim 1, wherein a handle latch is provided at the second end of the extendable slide assembly that releasably locks the extendable slide assembly against extending when the extendable slide assembly is fully retracted and the support bracket is receiving the handle.

4. The storage container support system according to claim 1, wherein the extendable slide assembly includes at least one pair of telescoping extendable members.

5. The support storage container system according to claim 4, wherein the extendable slide assembly includes two pairs of laterally spaced-apart and parallel telescoping extendable members.

6. The storage container support system according to claim 1, wherein the second end of the extendable support assembly removably supports the storage container.

7. The storage container support system according to claim 1, further comprising a release actuator at the handle which when activated, enables the extendable slide assembly to be extended and retracted, and wherein the support bracket activates the release actuator when the support bracket removably receives the handle.

8. The storage container support system according to claim 7, wherein a handle latch is provided at the second end of the extendable slide assembly that releasably locks the extendable slide assembly against extending when the extendable slide assembly is fully retracted and the support bracket is receiving the handle.

9. The storage container support system according to claim 1, wherein the storage container is a storage tote.

10. The storage container support system according to claim 1, wherein the storage container is a drawer.

11. The storage container support system according to claim 1, wherein the storage container is a suitcase.

12. A support system for a storage container comprising, in combination:
- an extendable slide assembly having a first end and a second end;
- wherein the second end of the extendable slide assembly is configured to support the storage container;
- a support bracket removably receiving the first end of the extendable slide assembly to support the extendable slide assembly in a cantilevered manner;
- wherein the first end of the extendable support assembly includes a handle and the support bracket receives the handle;
- a release actuator at the handle which when activated, enables the extendable slide assembly to be extended and retracted; and
- wherein the support bracket activates the release actuator when the support bracket removably receives the handle.

13. The support system according to claim 12, wherein the release actuator is a button which when depressed, enables the extendable slide assembly to be extended and retracted, and wherein the support bracket depresses the release button when the support bracket removably receives the handle.

14. The support system according to claim 12, wherein a handle latch is provided at the second end of the extendable slide assembly that releasably locks the extendable slide assembly against extending when the extendable slide assembly is fully retracted and the support bracket is receiving the handle.

15. A support bracket for supporting an extendable slide assembly in a cantilevered manner from a support, the extendable slide assembly having a first end for removable attachment to the support bracket and a second end for supporting a storage compartment, the support bracket comprising, in combination:
- a mounting portion configured to be secured to the support; and
- an attachment portion supported by the mounting portion and configured to removably receive the first end of the extendable slide assembly; and
- wherein the attachment portion includes:
  - at least one downward facing abutment forward of the mounting portion and configured to limit upward movement of the first end of the extendable slide assembly;
  - at least one upward facing abutment forward of the mounting portion and configured to limit downward movement of the first end of the extendable slide assembly, wherein the upward facing abutment is located below the downward facing abutment and extends further forward from the attachment portion than the downward facing abutment; and
  - a pair of opposed side abutments forward of the mounting portion and configured to limit lateral movement of the first end of the extendable slide assembly wherein at least a portion of the at least one downward facing abutment and the at least one upward facing abutment is located between the pair of side abutments.

16. The support bracket according to claim 7, wherein the support bracket is integrally formed as a one-piece component.

17. The support bracket according to claim 15, further comprising a rearward facing abutment forward of the mounting portion and configured to limit forward movement of the first end of the extendable slide assembly.

18. The support bracket according to claim 15, wherein the at least one upward facing abutment is formed by a horizontally extending and planar wall configured to support the first end of the extendable slide assembly thereon.

19. An extendable slide assembly comprising, in combination:
- at least one pair of telescoping extendable members extending between a first end and a second end;
- a release actuator at the first end which when activated, enables the extendable slide assembly to be extended and retracted; and
- a handle latch at the second end that releasably locks the extendable slide assembly against extending when the extendable slide assembly is fully retracted and the release actuator is actuated.

20. The extendable slide assembly according to claim 19, wherein the handle latch includes a handle pivotably attached to the second end that when pulled, unlocks the handle latch and extends the extendable slide assembly when the release actuator is actuated.

21. The extendable slide assembly according to claim 20, wherein the handle downwardly pivots about a horizontal and laterally extending pivot axis.

22. The extendable slide assembly according to claim 20, wherein the release actuator is a button which when depressed, enables the extendable slide assembly to be extended and retracted.

23. The extendable slide assembly according to claim 19, wherein the release actuator is a button which when depressed, enables the extendable slide assembly to be extended and retracted.

* * * * *